US006672746B2

(12) United States Patent
Amano

(10) Patent No.: US 6,672,746 B2
(45) Date of Patent: Jan. 6, 2004

(54) LED-TYPE VEHICULAR LAMP

(75) Inventor: Yasuyuki Amano, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/216,914

(22) Filed: Aug. 13, 2002

(65) Prior Publication Data

US 2003/0043593 A1 Mar. 6, 2003

(30) Foreign Application Priority Data

Aug. 30, 2001 (JP) ..................... P.2001-260682

(51) Int. Cl.⁷ .................................. F21S 8/10
(52) U.S. Cl. ................ 362/545; 362/517; 362/328; 362/800; 362/330
(58) Field of Search .................. 362/475, 507, 362/509, 514, 516, 517, 518, 520, 522, 540, 544, 545, 236, 240, 247, 332, 339, 346, 800, 541, 245, 327, 328, 330

(56) References Cited

U.S. PATENT DOCUMENTS 4,646,207 A 2/1987 Levin et al.
4,862,330 A * 8/1989 Machida et al. ............ 362/522
5,054,885 A 10/1991 Melby
5,453,855 A 9/1995 Nakamura et al.

FOREIGN PATENT DOCUMENTS

DE 196 38 081 A1 3/1998
JP 11-306810 11/1999

* cited by examiner

Primary Examiner—Sandra O'Shea
Assistant Examiner—Hargobind S. Sawhney
(74) Attorney, Agent, or Firm—Sughrue Mion, PLLC

(57) ABSTRACT

A vehicular lamp which radiates light by indirect illumination using a plurality of LED light sources and which has an improved appearance when the lamp is lit. Light from a plurality of LED light sources is formed into parallel light fluxes by a plurality of Fresnel lenses, and the parallel light fluxes are reflected toward the front of the lamp by a segmented reflector. The LED light sources and the lenses are divided into first and second groups which form respective light fluxes directed in orthogonal directions in a front view of the lamp. The reflecting surface of the reflector is divided into a plurality of segments, and first and second reflective elements, which reflect the parallel light fluxes from the respective lens groups, are provided in each of the segments. With this structure, a portion of all reflective elements can be seen brightly when viewing the lamp from a position directly in front of the lamp and within certain angular limits.

15 Claims, 10 Drawing Sheets

LED-TYPE VEHICULAR LAMP

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates to a vehicular lamp provided with a plurality of LED light sources, and more particularly to a vehicular lamp in which light is radiated using an indirect illumination technique.

Recently, vehicular lamps provided with an LED light source have frequently been employed. As described in Japanese Patent Application Laid-Open No. 11-306810, a lamp has been developed which provides a soft lighting effect using an indirect illumination technique whereby the LED light source is arranged so as not to be visible from the front of the lamp. Also, there has been known an indirect illumination type vehicular lamp structure in which a Fresnel lens is provided together with an LED light source, as described in German Patent Application No. 19638081.

FIGS. 9 and 10 are respectively a front elevational view and a side cross-sectional view showing a vehicular lamp 100 of this type.

As shown in these drawings, in the vehicular lamp 100 light from a plurality of upward directed LED light sources 102 is formed into upward directed parallel light fluxes by a plurality of Fresnel lenses 104 provided near the upper side of the light sources 102. The parallel light fluxes from the respective Fresnel lenses 104 are reflected toward the front of the lamp by a reflector 106.

It is possible to effectively utilize the light source light by combining the LED light sources 102 and the Fresnel lenses 104 in this manner. However, in the conventional vehicular lamp 100, there is a room for improvement in appearance when the lamp is lit.

That is, the reflecting surface 106a of the reflector 106 of the vehicular lamp 100 is divided into a plurality of segments with respect to the vertical direction, providing it with a stepped shape. Each segment is composed of a reflective element 106s reflecting a portion of the parallel light flux from the respective Fresnel lenses 104 in a diffused manner toward the front of the lamp and a step portion 106r extending in the vertical direction.

When viewing the reflecting surface 106a of the reflector 106 from directly in front of the lamp when the lamp is lit, a portion of each of the reflective elements 106s appear bright. However, the step portions 106r, which the parallel light fluxes from the Fresnel lenses 104 do not strike, appear dark, making the overall appearance of the lamp uneven, and hence not satisfactory.

BRIEF SUMMARY OF THE INVENTION

Taking the foregoing situation into consideration, it is an object of the present invention to provide a vehicular lamp of a type in which light is radiated by indirect illumination using a plurality of LED light sources and which has an improved appearance when the lamp is lit.

The present invention achieves the above and other objects by providing a vehicular lamp of the above-mentioned type having an improved reflector structure.

More specifically, a vehicular lamp according to the present invention is provided with a plurality of LED light sources, a plurality of lenses for forming parallel light fluxes from respective ones of the LED light sources, a reflector for reflecting the parallel light fluxes from respective ones of the lenses toward the front of the lamp, and a translucent cover provided on the front side of the reflector, wherein the plurality of LED light sources are divided into a first LED light source group and a second LED light source group, the plurality of lenses are divided into a first lens group which forms light from the first LED light source group into parallel light fluxes radiating in substantially the same first direction and a second lens group which forms light from the second LED light source group into parallel light fluxes radiating in substantially the same second direction with the first and second directions intersecting at a predetermined angle in a front view of the lamp, the reflecting surface of the reflector is divided into a plurality of segments, and a first reflective element for reflecting the parallel light fluxes from the first lens group and a second reflective element for reflecting the parallel light fluxes from the second lens group are formed in each of the segments.

The specific structure of the lenses is not particularly limited as far as the lenses can form the light from each of the LED light sources into a parallel light flux. For example, it is possible to employ a single spherical lens, a combination lens, a Fresnel lens or the like.

Concerning the direction of the parallel light fluxes mentioned above, the specific direction thereof is not particularly limited as far as the direction is along a line intersecting the longitudinal direction of the lamp; for example, it is possible for the direction of the parallel light fluxes to be an upward direction or a lateral direction by making such direction orthogonal to the longitudinal direction of the lamp.

The term "intersect at a predetermined angle in a front view of the lamp" means not being arranged parallel to the front view of the lamp. Also, the intersecting angle is not particularly limited.

Structural details, such as shape, size and the like, of each of the first and second reflective elements is not particularly limited as far as these elements are structured so as to reflect the parallel light fluxes from each of the lenses toward the front of the lamp. Moreover, the arrangement of the segments is not particularly limited.

As discussed above, the vehicular lamp according to the present invention is structured so as to form the light from a plurality of LED light sources into parallel light fluxes with a plurality of lenses and reflect the parallel light fluxes toward the front of the lamp with the reflector. The radiating direction of the parallel light fluxes from the first lens group and the radiating direction of the parallel light fluxes from the second lens group are set so as to intersect at a predetermined angle in the front view of the lamp. Further, the reflecting surface of the reflector is divided into a plurality of segments, and the first reflective element for reflecting the parallel light fluxes from the first lens group and the second reflective element for reflecting the parallel light fluxes from the second lens group are provided in each of the segments. With this structure, the following effects can be obtained.

That is, each of the segments appears bright in the area of the first reflective element and the portion of the second reflective element when viewing the reflecting surface of the reflector from the directly in front of the lamp when the lamp is lit. Therefore, it is possible to make the reflecting surface visible over a wide viewing range compared to the conventional reflector.

Therefore, according to the vehicular lamp of the present invention where light is radiated by indirect illumination using a plurality of LED light sources, the appearance of the lamp when the lamp is lit is improved.

In the inventive lamp, the arrangement of the first reflective element and the second reflective element in each of the segments is not particularly limited, as mentioned above. However, in the case where a first reflective element and a step portion are provided for the parallel light fluxes from the first lens group and the second reflective element is provided for the parallel light fluxes from the second lens group, it is possible to make a part of the step portion which corresponds to a dark portion in the conventional lamp appear bright due to the presence of the second reflective element, thereby achieving a better overall appearance of the lamp.

Further, in the case where the radiating direction of the parallel light fluxes from the first lens group is in an upward direction and the radiating direction of the parallel light fluxes from the second lens group is in a lateral direction of the lamp, it is readily possible to provide mounting space for the first LED light source group and the first lens group and mounting space for the second LED light source group and the second lens group, and it is also possible to maximize the reflection efficiency of each of the first reflective elements and each of the second reflective elements by making the radiating direction of the parallel light fluxes from the first lens group and the radiating direction of the parallel light fluxes from the second lens group orthogonal in the manner mentioned above.

Moreover, in the case where the first reflective elements and the second reflective elements are each constituted by a curved surface which reflects the parallel light fluxes from the lens in a diffused manner in vertical and horizontal directions, it is possible to obtain the required lamp light distribution performance even if the translucent cover is plain. (By "plain" is meant that the cover contains no lens elements or the like to diffuse the light passing therethrough.)

In an alternative embodiment, each of the first reflective elements and each of the second reflective elements may be constituted by a flat surface so as to reflect the parallel light fluxes from the lens toward the front of the lamp while maintaining the light fluxes in a parallel state, in which case diffusion lens elements are formed in the translucent cover or the like to diffuse the light in the vertical and lateral directions. In another alternative embodiment, one of the first reflective elements and the second reflective elements are constituted by curved surfaces having curvature only in one direction so as to reflect the parallel light fluxes from the lens toward the front of the lamp only in one direction in a diffused manner, and which case diffusion lens elements are formed in the translucent cover or the like to diffuse the light passing through the cover in the direction orthogonal to the one direction.

The application of the vehicular lamp of the invention is not particularly limited. However, if embodied as a tail and stop lamp, with the first LED light source group used in a tail lamp lighting mode and the first LED light source group and the second LED light source group in a stop lamp lighting mode, it is possible to make the appearance of the lamp different between the two lighting modes, lending novelty to the appearance of the lamp when lit.

DETAILED DESCRIPTION OF THE INVENTION

A description will be given below with reference to the accompanying drawings of a preferred embodiment of a vehicular lamp constructed according to the present invention.

Figure 1:
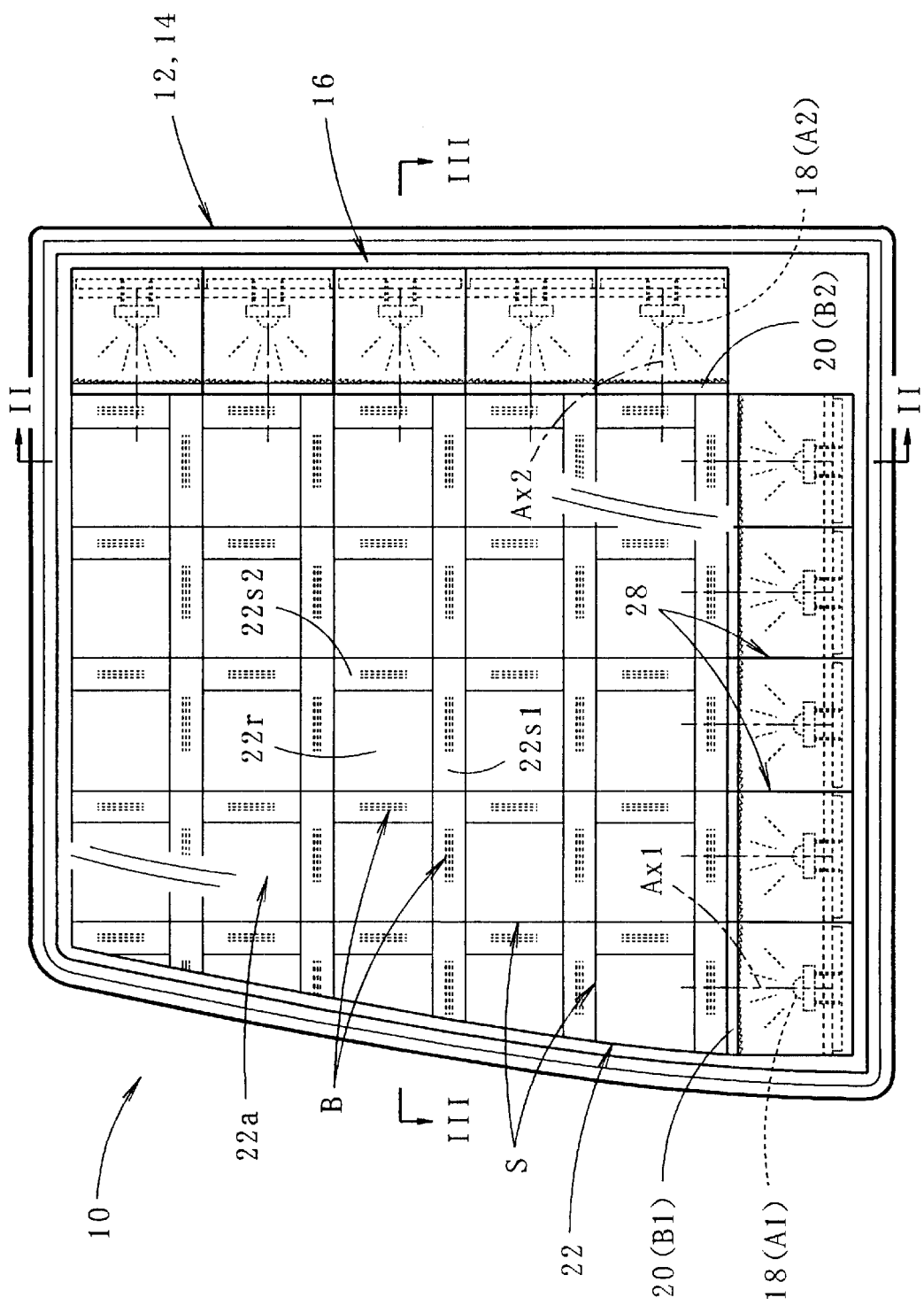
FIG. 1 is a front elevational view showing a vehicular lamp constructed according to a preferred embodiment of the present invention.
Figure 2:
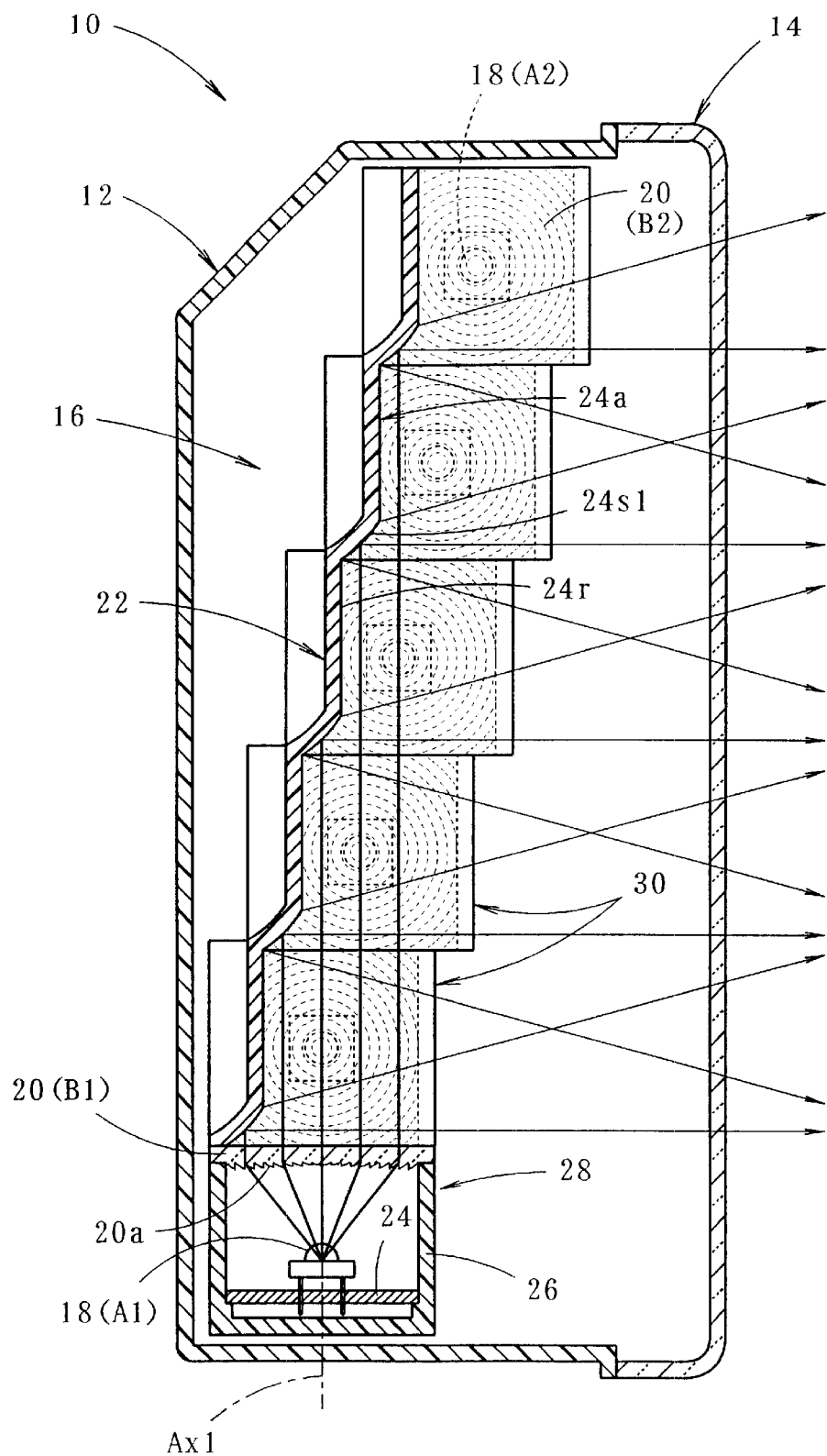
FIG. 2 is a cross-sectional view taken along a line II—II in FIG. 1.
Figure 3:
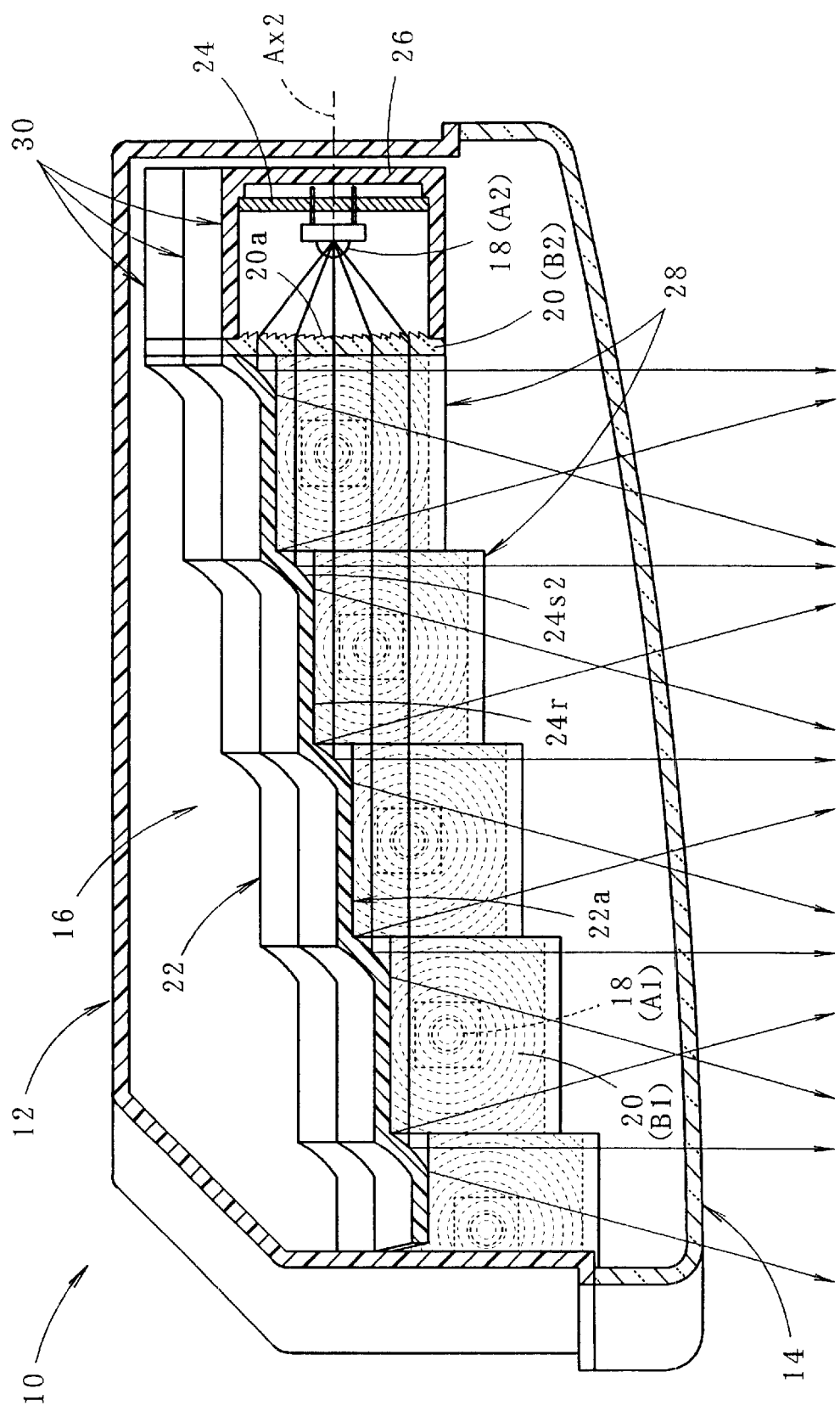
FIG. 3 is a cross-sectional view taken along a line III—III in FIG. 1.

FIG. 1 is a front elevational view showing a vehicular lamp constructed according to the preferred embodiment, and FIGS. 2 and 3 are respectively a cross-sectional view taken along a line II—II in FIG. 1 and a cross-sectional view taken along a line III—III in FIG. 1.

As shown in these drawings, a vehicular lamp 10 of the present embodiment is formed as a tail and stop lamp adapted to be mounted at a right corner portion at the rear end of a vehicle. The lamp 10 includes a lamp unit 16 housed within a lamp chamber constituted by a lamp body 12 and a plain, translucent cover 14.

The lamp unit 16 is constituted by ten LED light sources 18, ten Fresnel lenses 20 which form light from the respective LED light sources 18 into parallel light fluxes, and a reflector 22 which reflects the parallel light fluxes from the respective Fresnel lenses 20 toward the front of the lamp (i.e., the rear side of the vehicle; the same directional reference is applied in the following description).

The ten LED light sources 18 are divided into a first LED light source group A1 and a second LED light source group A2, which contain five light sources each.

The LED light sources 18 constituting the first LED light source group A1 are arranged in a lateral direction near the lower side of the reflector 22 and are directed upward. The respective LED light sources 18 constituting the second LED light source A2 are arranged in a vertical direction near the right side of the reflector 22 and are directed leftward.

Further, the ten Fresnel lenses 20 mentioned above are also divided into a first lens group B1 and a second lens group B2, which contain five lenses each.

The Fresnel lenses 20 constituting the first lens group B1 are arranged in a lateral direction along the lower end edge of the reflector 22 close to the upper side of the respective LED light sources 18 constituting the first LED light source group A1. Each of these Fresnel lenses 20 has an optical axis Ax1 extending in the vertical direction and passing through the center position of each of the LED light sources 18, and a Fresnel lensing portion 20a is formed on a lower surface thereof. Each of the Fresnel lenses 20 forms the light from a corresponding one of the LED light sources 18 into a parallel light flux directed upward.

The Fresnel lenses 20 constituting the second lens group B2 are arranged in a vertical direction along the right end edge of the reflector 22 close to the left side of the respective LED light sources 18 constituting the second LED light source group A2. Each of the Fresnel lenses 20 has an optical axis Ax2 extending in the horizontal direction so as to pass through the center position of each of the LED light sources 18, and a Fresnel lens portion 20a is formed on the right-side surface thereof. Thus, each of the Fresnel lenses 20 forms the light from a corresponding one of the LED light sources 18 into a parallel light flux directed leftward.

Each of the LED light sources 18 constituting the first LED light source group A1 includes a rectangular parallelepiped first light source unit 28 together with a Fresnel lens 20 arranged close to the upper side thereof, a printed circuit board 24 which supports the LED light source 18, and a housing 26 which supports the printed circuit board 24 and the Fresnel lens 20. Each of the LED light sources 18 constituting the second LED light source group A2 includes a rectangular parallelepiped second light source unit 30 together with a Fresnel lens 20 arranged close to the left side thereof, the printed circuit board 24 which supports the LED light source 18, and the housing 26 which supports the printed circuit board 24 and the Fresnel lens 20.

Figure 4:
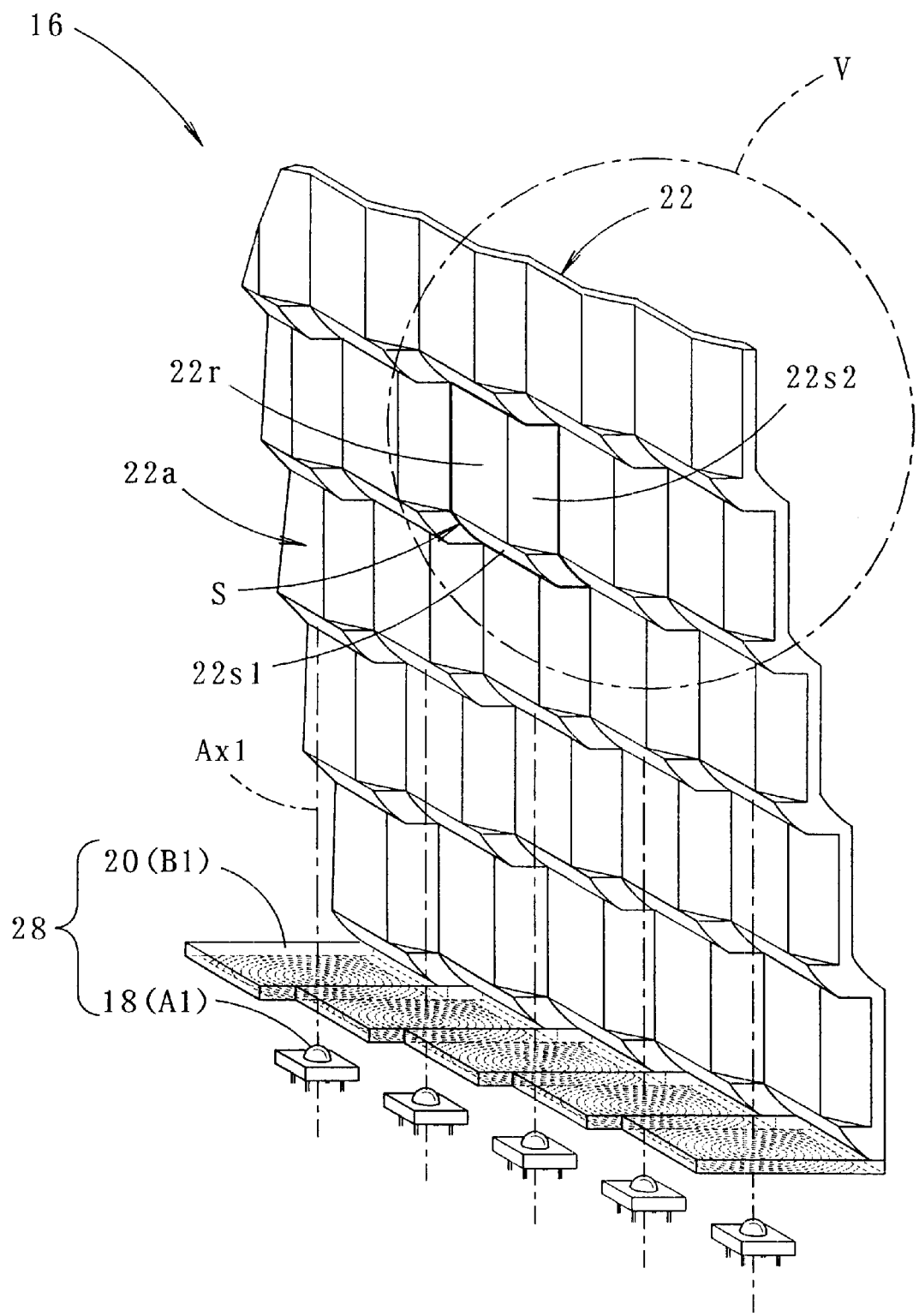
FIG. 4 is a simplified perspective view showing a lamp unit of the vehicular lamp of FIG. 1 in such a manner as to simplify a part of a first light source unit thereof and omit a second light source unit thereof.

FIG. 4 is a perspective view showing the lamp unit 16 in such a manner as to simplify a part of the first light source unit 28 and omit the second light source unit 30.

As shown in this drawing, the reflecting surface 22a of the reflector 22 is sectioned into a plurality of segments S so as to form a vertical and horizontal lattice in a front view of the lamp. The lateral width of each of the segments S is the same as the lateral width of each of the first light source units 28, while the vertical width thereof is the same as the vertical width of each of the second light source units 30.

A first reflective element 22s1 for reflecting the parallel light flux from the first lens group B1 and a second reflective element 22s2 for reflecting the parallel light flux from the second lens group B2 are respectively provided in each of the segments S. The first reflective element 22s1 is formed in an area close to the lower end of each of the segments S, and the second reflective element 22s2 is formed in an area close to the right end in the remaining area, while the remaining area is formed as a step portion 22r. The step portion 22r is formed as a vertical surface which none of the parallel light fluxes from the Fresnel lenses 20 in the light source units 28 and 30 strike.

Accordingly, the reflecting surface 22a of the reflector 22 is formed in a stepped shape, stepping from the left end portion toward the right end portion to the rear side of the lamp and from an upper end portion thereof toward the lower end portion to the rear side of the lamp. Moreover, each of the first light source units 28 is arranged in a stepped shape, stepping from the left end portion of the lamp unit 16 toward the right end portion to the rear side of the lamp, and each of the second light source units 30 is arranged in a stepped shape, stepping from the upper end portion of the lamp unit 16 toward the lower end portion to the rear side of the lamp.

Figure 5:
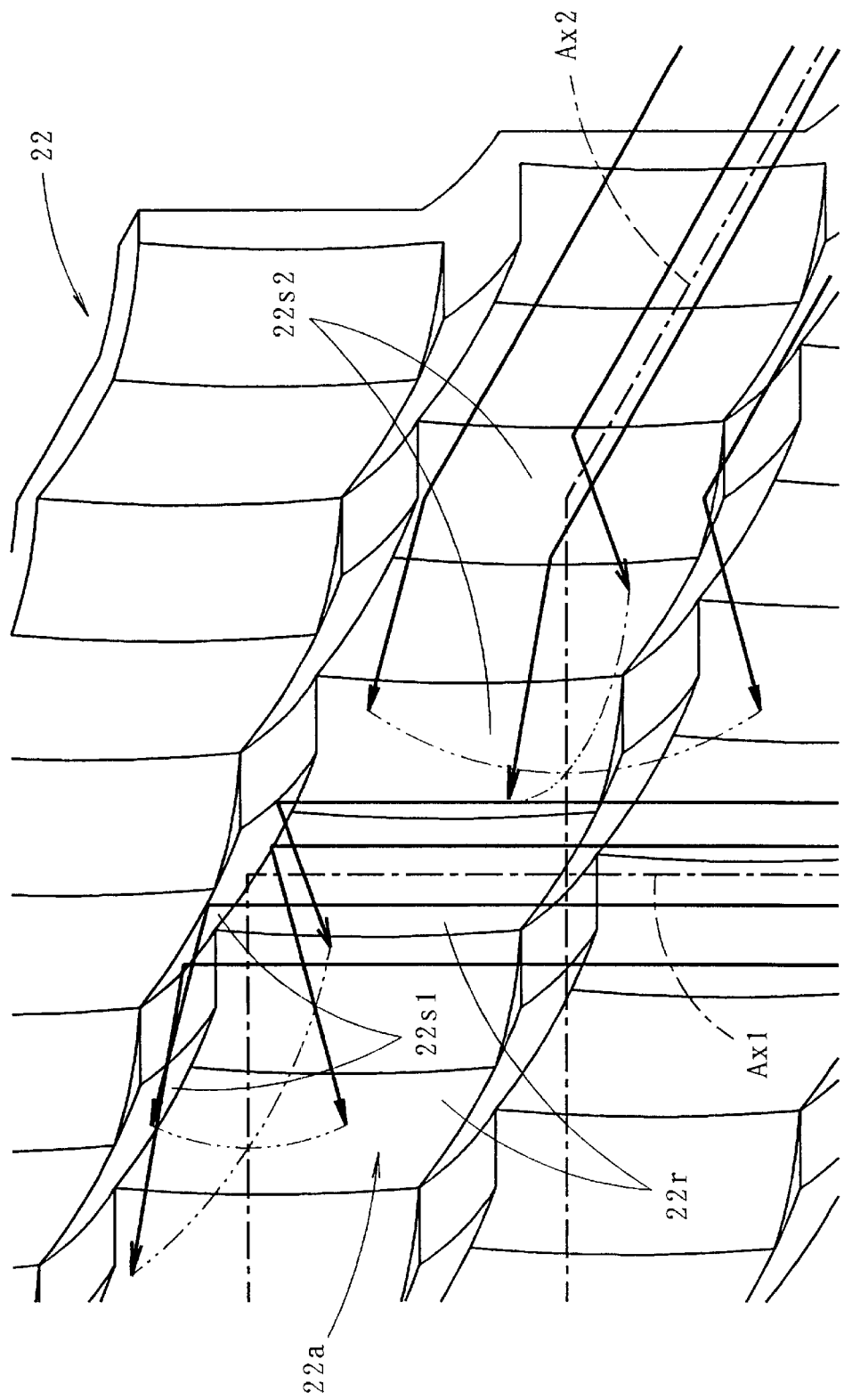
FIG. 5 is a detailed view of a portion V in FIG. 4.

FIG. 5 is a detailed view of a portion V indicated in FIG. 4.

As illustrated, each of the first reflective elements 22s1 is formed by a substantially spherical curved surface so as to reflect the parallel light fluxes from each of the Fresnel lenses 20 in a diffused manner at predetermined diffusion angles in both vertical and horizontal directions centered around the direction directly to the front of the lamp. The diffusion angles in the vertical direction and the lateral direction of each of the first reflective elements 22s1 are the same among the respective first reflective elements 22s1. Further, each of the second reflective elements 22s2 is formed by a substantially spherical curved surface so as to reflect the parallel light fluxes from of the respective Fresnel lenses 20 in a diffused manner at predetermined diffusion angles in vertical and horizontal directions centered around the direction directly to the front of the lamp. The diffusion angles in the vertical direction and the lateral direction of each of the second reflective elements 22s2 are the same among the respective second reflective elements 22s2.

As shown in FIG. 1, when viewing the reflecting surface 22a of the reflector 22 from a point directly in front of the lamp when the lamp is lit, each of the segments S appears bright in the area of the first reflective element 22s1 and the area of the second reflective element 22s2. Since the first reflective elements 22s1 and the second reflective elements 22s2 are constituted by curved surfaces which reflect the parallel light fluxes from the Fresnel lens 20 in a diffused manner in both vertical and lateral direction, the center portion of the reflecting surface 22a is seen illuminated in a scattered manner with a bright portion B at each of the first reflective elements 22s1 and at each of the second reflective element 22s2. When moving the viewing point upward, downward, rightward, and leftward from the position directly in front of the lamp, the position of the bright portion B also moves upward, downward, rightward, and leftward within each of the reflective elements 24s. Since the diffusion angle of each of the first reflective elements 22s1 and each of the second reflective elements 22s2 are the same among the first reflective elements 22s1 and among the second reflective elements 22s2, all the first reflective elements 22s1 and the second reflective elements 22s2 appear bright up to the limits of the maximum diffusion angle, and all the first reflective elements 22s1 and the second reflective elements 22s2 become dark when the viewing angle exceeds the maximum diffusion angle.

In the tail lamp lighting mode the first LED light source group A1 and the second LED light source group A2 are not activated, while electric current is supplied to all of the LED light sources 18 in the stop lamp lighting mode, thereby lighting all of the LED light sources 18 brightly.

As described in detail above, in the vehicular lamp 10 according to the present embodiment light from a plurality of LED light sources 18 is formed into parallel light fluxes with the Fresnel lenses 20 and the parallel light fluxes are reflected toward the front of the lamp by the reflector 22. However, the radiating direction of the parallel light fluxes from the first lens group B1 (which forms the upward directed parallel light fluxes from the first LED light source group A1) and the radiating direction of the parallel light fluxes from the second lens group B2 (which forms the leftward directed parallel light fluxes from the second LED light source group A2) are set so as to be orthogonal in a front view of the lamp. Further, the reflecting surface 22a of the reflector 22 is divided into a plurality of segments S, and a first reflective element 22s1 for reflecting the parallel light fluxes from the first lens group B1 and a second reflective element 22s2 for reflecting the parallel light fluxes from the second lens group B2 are formed in each of the segments S. With this structure, the following operations and effects can be obtained.

As shown in FIG. 1, each of the segments S appears bright in the area of the first reflective element 22s1 and the area of the second reflective element 22s2 when viewing the reflecting surface 22a of the reflector 22 from directly in front of the lamp when the lamp is lit. Therefore, it is possible to make the reflecting surface 22a visible over a wider range than can be achieved with the conventional reflector.

Therefore, according to the present invention, a vehicular lamp is provided with which light is radiated by indirect illumination using a plurality of LED light sources wherein the lamp has an improved an appearance when lit.

Moreover, since a first reflective element 22s1 and step portion 22r are provided in each of the segments S for the parallel light fluxes from the first lens group B1 and a second reflective element 22s2 is provided on the step portion 22r for the parallel light fluxes from the second lens group B2, a part of the step portion 22r which creates a dark portion in the conventional lamp is brightly visible due to the presence of the second reflective element 22s2, thereby increasing the brightness of the lamp beyond that of the conventional lamp.

Further, since the radiating direction of the parallel light fluxes from the first lens group B1 is in the upward direction and the radiating direction of the parallel light fluxes from the second lens group B2 is in a lateral direction of the lamp, it is readily possible to provide suitable mounting spaces for the first LED light source group A1 and the first lens group B1 as well as for the second LED light source group A2 and the second lens group B2. Further, the reflection efficiency of the first reflective elements 22s1 and the second reflective elements 22s2 is maximized by making the radiating direction of the parallel light fluxes from the first lens group B1 and the radiating direction of the parallel light fluxes from the second lens group B2 orthogonal in the manner mentioned above.

Still further, since the first reflective elements 22s1 and the second reflective elements 22s2 are each constituted by a curved surface which reflects the parallel light fluxes from the Fresnel lenses 20 in a diffused manner in both vertical and lateral directions, it is possible to attain the desired lamp light distribution performance even if the translucent cover 14 is plain.

Also, since the diffusion angles of the first reflective elements 22s1 and the second reflective elements 22s2 are the same among all the first reflective elements 22s1 and second reflective elements 22s2, the position of the bright portion B moves upward, downward, rightward, and leftward from the center of each of the first reflective elements 22s1 and each of the second reflective elements 22s2 when the viewing position is moved upward, downward, rightward, and leftward from a position directly in front of the lamp. Since all the first reflective elements 22s1 and the second reflective elements 22s2 appear bright up to the limits of the diffusion angle for the first reflective elements 22s1 and the second reflective elements 22s2, and then all the first reflective elements 22s1 and the second reflective elements 22s2 appear dark at once when the viewing point is moved beyond this diffusion angle, the overall appearance of the lamp is further improved.

Rather than constructing each of the reflective elements 24s as a substantially spherical curved surface, it is possible to obtain suitable light diffusion in both vertical and lateral directions by constructing each of the first reflective elements 22s1 and each of the second reflective elements 22s2 as a flat surface so as to reflect the parallel light fluxes from the Fresnel lens 32 toward the front of the lamp while maintaining their parallel state, and forming diffusion lens elements in the translucent cover 14 (or in an inner lens) to diffuse the light passing through the cover 14 in both vertical and horizontal directions. Alternatively, it is possible to reflect the parallel light fluxes from the Fresnel lens 32 toward the front of the lamp in a diffused manner only in one direction by constructing each of the first reflective elements 22s1 and each of the second reflective elements 22s2 as a curved surface having a curvature only in one direction, with diffusion lens elements formed in the cover 14 or the like for diffusing the light in the direction orthogonal to the one direction.

Figure 6:
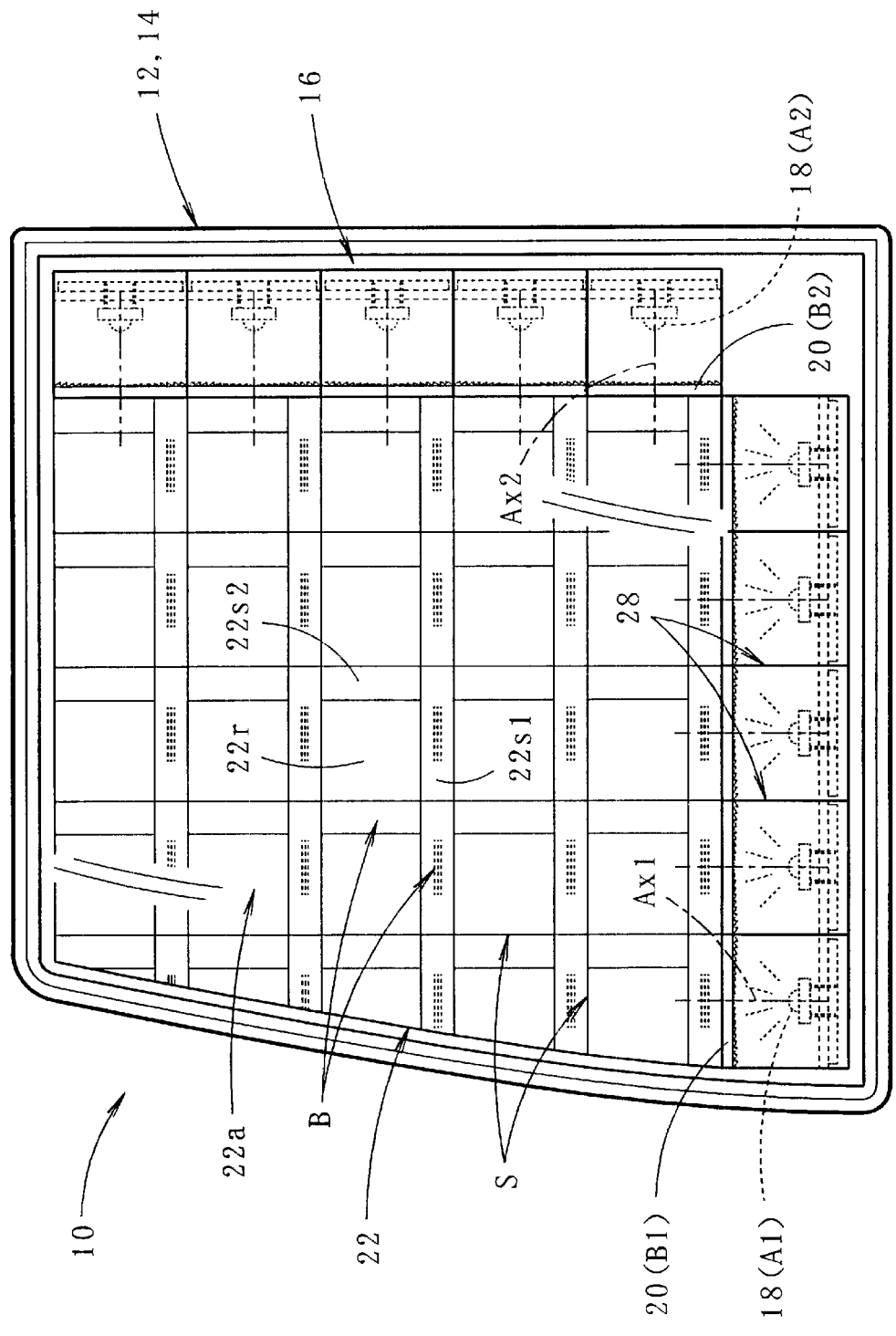
FIG. 6 is a front elevational view showing a modified embodiment of the invention.

In embodiments described above, in both the tail lamp lighting mode and the stop lamp lighting mode, light is radiated from both the first LED light source group A1 and the second LED light source group A2. However, as shown in FIG. 6, it is also possible to radiate light from only the first LED light source group A1 in the tail lamp lighting mode and to radiate light from both the first LED light source group A1 and the second LED light source group A2, as shown in FIG. 1, in the stop lamp lighting mode. Accordingly, the appearance of the lamp can be changed between the two lighting modes, providing novelty to the appearance of the lamp when lit.

Figure 7:
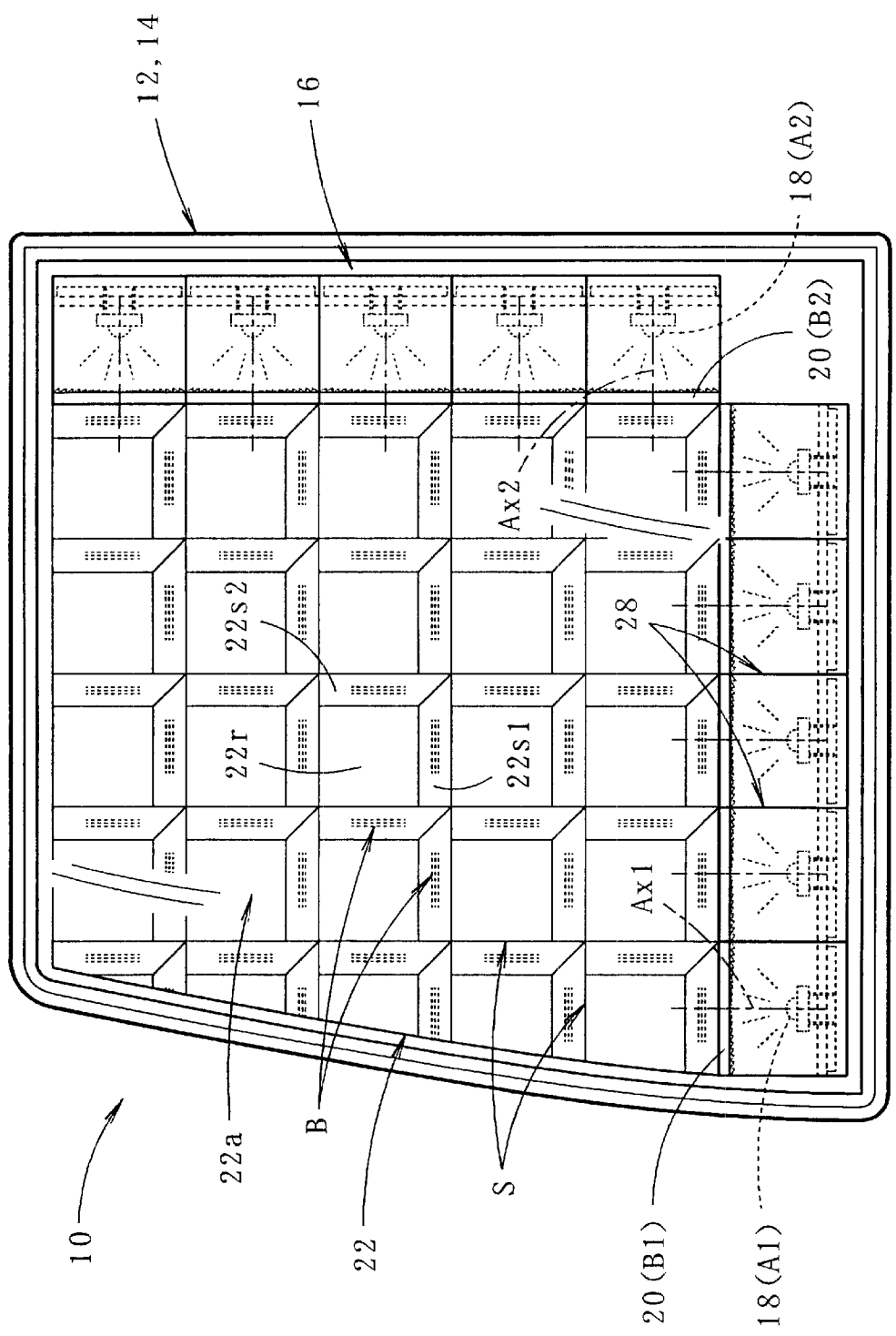
FIG. 7 is a front elevational view showing another modified embodiment of the invention.
Figure 8:
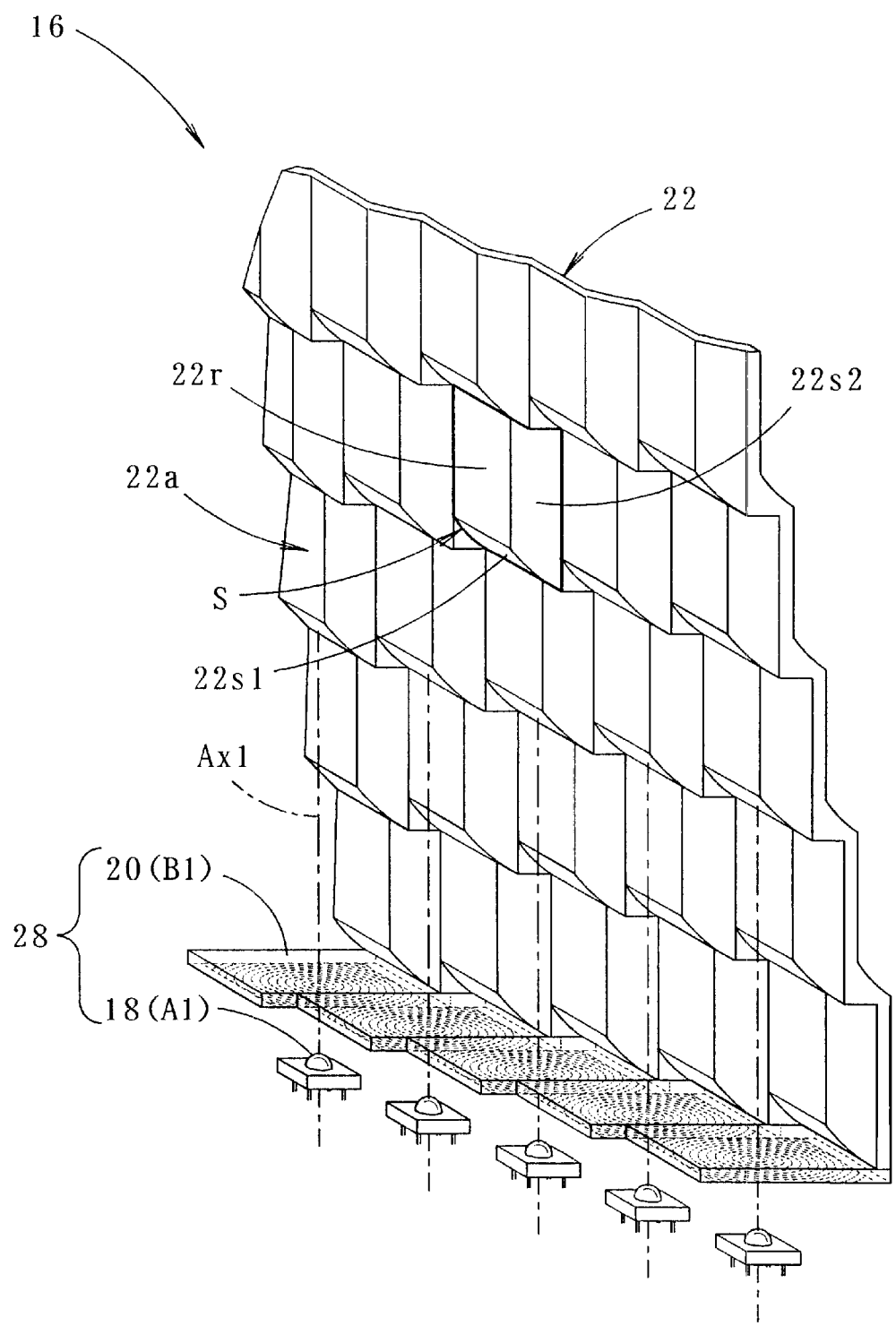
FIG. 8 is a similar view to FIG. 4, which shows the another modified embodiment of the invention.
Figure 9:
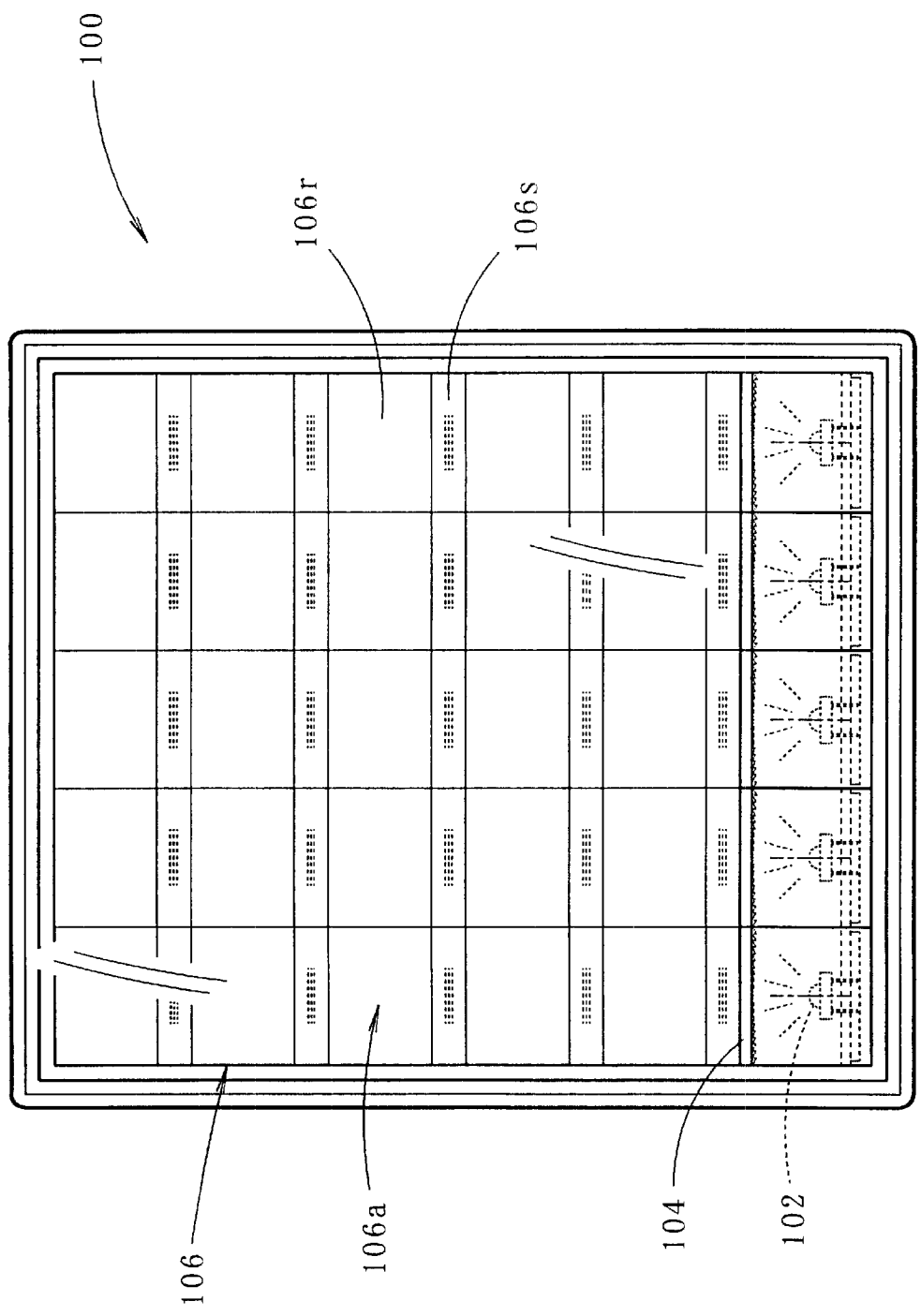
FIG. 9 is a similar view to FIG. 1 showing a conventional lamp.
Figure 10:
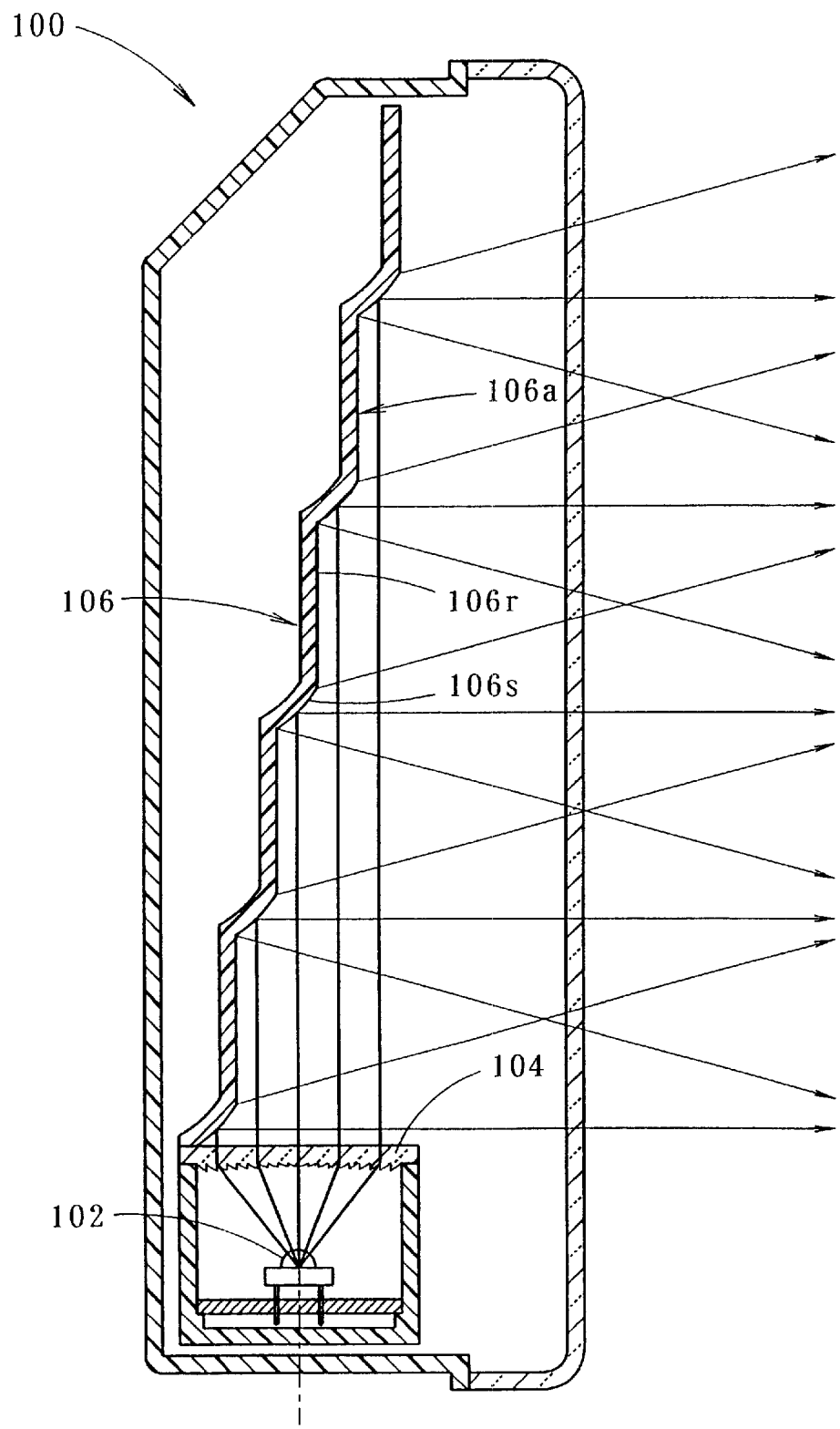
FIG. 10 is a similar view to FIG. 2 showing the conventional lamp of FIG. 9.

Further, it has been described above that in each of the segments S the first reflective element 22s1 and the step portion 22r are allocated with respect to the radiating direction of the parallel light fluxes from the first lens group B1 and the second reflective element 22s2 is allocated to the step portion 22r with respect to the radiating direction of the parallel light fluxes from the second lens group B2. However, as shown in FIGS. 7 and 8, the first reflective elements 22s1 and the second reflective elements 22s2 may be formed in a trapezoidal shape (in a front view of the lamp). In such a case the first reflective elements 22s1 and the second reflective elements 22s2 are of substantially uniform brightness.

The above description relates to the case where the lamp unit 16 is embodied as a tail and stop lamp. However, the lamp unit can be employed as another type of vehicular lamp, for example, a clearance lamp or the like, while retaining the same effects as those of the embodiments described.

It should further be apparent to those skilled in the art that various changes in form and detail of the invention as shown and described above may be made. It is intended that such changes be included within the spirit and scope of the claims appended hereto.

What is claimed is:

1. A vehicular lamp comprising:
   a plurality of LED light sources comprising a first LED light source group and a second LED light source group;
   first lens means for forming light from said first LED light source group into corresponding parallel light fluxes directed in a first direction, and second lens means for forming light from said second LED light source group into corresponding parallel light fluxes directed in a second direction non-parallel to said first direction;
   means for reflecting said parallel light fluxes from said lens means in a frontward direction of said lamp; and a translucent cover provided on a front side of said reflector.

2. The vehicular lamp according to claim 1, wherein said first and second directions are orthogonal to one another.

3. The vehicular lamp according to claim 1, wherein said reflecting means comprises a plurality of segments arranged in an array.

4. The vehicular lamp according to claim 3, wherein each of said segments comprises means for reflecting light of a light flux of a corresponding one of said LED light sources of said first LED light source group in a frontward direction of said lamp toward said cover in a diffused manner in vertical and horizontal directions, and means for reflecting light of a light flux of a corresponding one of said LED light sources of said second LED light source group in said frontward direction in a diffused manner in vertical and horizontal directions.

5. The vehicular lamp according to claim 3, wherein each of said segments comprises means for reflecting light of a light flux of a corresponding one of said LED light sources of said first LED light source group in a frontward direction of said lamp toward said cover in a diffused manner in one of a vertical direction and a horizontal direction, and means for reflecting light of a light flux of a corresponding one of said LED light sources of said second LED light source group in said frontward direction in a diffused manner in said one of said vertical and horizontal directions, and wherein said cover comprises lens elements for diffusing light passing through said cover in the other of said vertical direction and said horizontal direction.

6. A vehicular lamp comprising:
   a plurality of LED light sources comprising a first LED light source group and a second LED light source group;
   a plurality of lenses comprising a first lens group for forming light from said first LED light source group into corresponding parallel light fluxes directed in a first direction and a second lens group for forming light from said second LED light source group into corresponding parallel light fluxes directed in a second direction substantially orthogonal to said first direction;
   a reflector for reflecting said parallel light fluxes from said lens toward a front of said lamp, a reflecting surface of said reflector being divided into a plurality of segments, each of said segments comprising a first reflective element for reflecting parallel light fluxes from said first lens group toward said front of said lamp and a second reflective element for reflecting parallel light fluxes from said second lens group toward said front of said lamp; and
   a translucent cover provided on a front side of said reflector.

7. The vehicular lamp according to claim 6, wherein each of said segments further comprises a step portion adjacent said first reflective element.

8. The vehicular lamp according to claim 6, wherein said first direction is an upward direction and said second direction is a lateral direction of said lamp.

9. The vehicular lamp according to claim 6, wherein each of said first reflective elements and each of said second reflective elements comprises a curved surface which reflects the corresponding one of said parallel light fluxes in a diffused manner in vertical and horizontal directions.

10. The vehicular lamp according to claim 9, wherein said curved surface is a substantially spherical surface.

11. The vehicular lamp according to claim 6, wherein each of said first reflective elements and each of said second reflective elements comprises a curved surface which reflects the corresponding one of said parallel light fluxes in a diffused manner in one of a vertical direction and a horizontal direction, and wherein said cover comprises lenses for diffusing light passing therethrough in the other of said vertical direction and said horizontal direction.

12. The vehicular lamp according to claim 6, wherein each of said first reflective elements and each of said second reflective elements comprises a flat surface which reflects the corresponding one of said parallel light fluxes in a forward direction of said lamp toward said cover while maintain said light fluxes in a parallel state, and wherein said cover comprises lenses for diffusing light passing therethrough in vertical and horizontal directions.

13. The vehicular lamp according to claim 6, wherein said lenses of said first and second lens groups each comprises a Fresnel lens.

14. A method of operating a vehicular lamp, comprising the steps of:
   providing a vehicular lamp comprising:
      a plurality of LED light sources comprising a first LED light source group and a second LED light source group;
      first lens means for forming light from said first LED light source group into corresponding parallel light fluxes directed in a first direction, and second lens means for forming light from said second LED light source group into corresponding parallel light fluxes directed in a second direction non-parallel to said first direction;
      means for reflecting said parallel light fluxes from said lens means in a frontward direction of said lamp; and
      a translucent cover provided on a front side of said reflector; and
   activating said first LED light source group to emit light in a tail lamp lighting mode, and activating both said first LED light source group and said second first LED light source group to emit light in a stop lamp lighting mode.

15. A method of operating a vehicular lamp, comprising the steps of:
   providing a vehicular lamp comprising:
      a plurality of LED light sources comprising a first LED light source group and a second LED light source group;
      a plurality of lenses comprising a first lens group for forming light from said first LED light source group into corresponding parallel light fluxes directed in a first direction and a second lens group for forming light from said second LED light source group into corresponding parallel light fluxes directed in a second direction substantially orthogonal to said first direction;
      a reflector for reflecting said parallel light fluxes from said lens toward a front of said lamp, a reflecting surface of said reflector being divided into a plurality of segments, each of said segments comprising a first reflective element for reflecting parallel light fluxes from said first lens group toward said front of said lamp and a second reflective element for reflecting parallel light fluxes from said second lens group toward said front of said lamp; and
      a translucent cover provided on a front side of said reflector; and
   activating said first LED light source group to emit light in a tail lamp lighting mode, and activating both said first LED light source group and said second first LED light source group to emit light in a stop lamp lighting mode.

* * * * *